United States Patent [19]

Kuroyanagi et al.

[11] 4,155,090
[45] May 15, 1979

[54] AUTOMOBILE WINDOW GLASS EQUIPPED WITH THERMAL DEFOGGING WIRES

[75] Inventors: Yoshitaka Kuroyanagi; Tatsuo Teratani, both of Toyota, Japan

[73] Assignee: Toyota Jidosha Kogyo Kabushiki Kaisha, Toyota, Japan

[21] Appl. No.: 736,413

[22] Filed: Oct. 28, 1976

[30] Foreign Application Priority Data

Jun. 3, 1976 [JP] Japan .................................. 51-64822

[51] Int. Cl.² .......................... H01Q 1/02; H01Q 1/32
[52] U.S. Cl. ..................................... 343/713; 343/704
[58] Field of Search ................ 343/704, 711, 712, 713

[56] References Cited

U.S. PATENT DOCUMENTS

| | | | |
|---|---|---|---|
| 3,766,563 | 10/1973 | Sauer et al. ........................... | 343/713 |
| 3,928,748 | 12/1975 | Sauer ..................................... | 343/704 |
| 4,056,782 | 11/1977 | Makino et al. ........................ | 343/711 |

OTHER PUBLICATIONS

*Reference Data for Radio Engineers*, Fifth Edition, Howard Sams & Co., Inc., N.Y. 1969, Chap. 22, pp. 5-6, 13-19.

*Stripline Circuit Design*, Harlan Howe, Jr., Artech House, Inc., 1974, pp. 183, 235-236.

Primary Examiner—Alfred E. Smith
Assistant Examiner—Harry E. Barlow
Attorney, Agent, or Firm—Koda and Androlia

[57] ABSTRACT

Automobile window glass having a pattern of thermal defogging wires therein. The pattern of thermal defogging wires further includes a low impedance branch line coupled to the power feed point of the thermal defogging wires whereby the noise current in the pattern of thermal defogging wires is suppressed.

3 Claims, 15 Drawing Figures

AUTOMOBILE WINDOW GLASS EQUIPPED WITH THERMAL DEFOGGING WIRES

BACKGROUND OF THE INVENTION

1. Field of Invention

This invention relates to window glass equipped with thermal defogging wires for use in motor vehicles and in particular to means for suppressing the noise generated in the thermal defogging wires.

2. Description of the Prior Art

In recent years motor vehicles have been equipped with various electronic devices such as FM radios, radio telephones, electronically controlled fuel injection systems, etc. Since such devices are operated by signals in the high frequency range, they have suffered from a drawback of being susceptible to the detrimental effects of high frequency noise currents. Such noise currents are generated by the ignition system, the voltage regulator, and various other switches such as the horn relay, turn signals, etc. Since the electronic devices are susceptible to the detrimental effects of high frequency noise currents, counter measures are needed to reduce or eliminate the detrimental effects.

Particularly, noise currents are enhanced in the case of a motor vehicle window glass which has thermal defogging wires either embedded in it or attached to it. It is well known that these thermal defogging wires become secondary radiators which radiate noise currents that have built up in the defogger current supply wire. Furthermore, with the advent of radio antennas that are also contained in the window glass, the susceptibility to the harmful effects of noise generated by the thermal defogging wires is greatly increased. The installation of both the radio antenna and the thermal defogging wires in window glass is a very desirable feature, but the amount of noise generated by the thermal defogging wires is undesirably large. This undesirably large noise current in the defogging wires causes a noticeable drop in the signal to noise ratio of the signals received by the antenna and has made the use of such antennas almost impractical.

In the prior art, noise prevention devices, such as condensers, that bypass the high frequency noise current, have been attached to the source of high frequency noise currents for the purpose of noise suppression. Other means of noise suppression include separating the current supply wires for the thermal defogging wires and the wires in which noise currents are built up, or to avoid the coupling of noise currents from one wire to another by means of shielded wires, etc. However, these prior art methods have not only been insufficiently effective but have also suffered from the drawback of requiring the installation of special devices.

This invention is the result of lessons learned in connection with the above mentioned difficulties that have been encountered in the prior art.

SUMMARY OF THE INVENTION

Accordingly, it is the general object of the present invention to provide a means in the vehicle window glass for suppressing the noise currents generated in the thermal defogging wires.

It is another object of the present invention to provide a means for suppressing the noise currents in the defogging wires of a vehicle window glass which is low in cost.

In keeping with the principles of the present invention, the objects are accomplished by a unique automobile window glass having a pattern of thermal defogging wires provided therein. The pattern of thermal defogging wires provided in the automobile window glass includes a low impedance branch line coupled to the power feedpoint of the thermal defogging wires whereby the noise current in the thermal defogging wires is suppressed. The low impedance branch line in one embodiment includes a conductive line which is connected at one end to the current supply terminal of the thermal defogging wires and is open at the other end.

BRIEF DESCRIPTION OF THE DRAWINGS

The above mentioned and other features and objects of the present invention will become more apparent by reference to the following description taken in conjunction with the accompanying drawings, wherein like reference numerals denote like elements and in which.

DETAILED DESCRIPTION OF THE INVENTION

Figure 14:
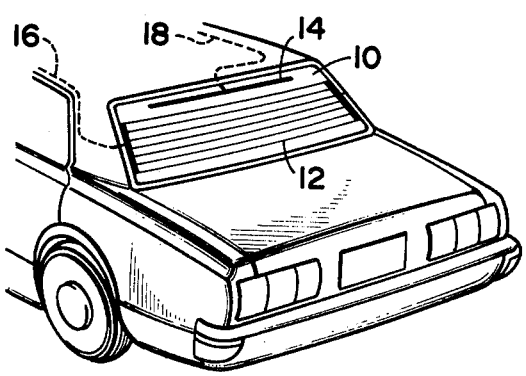
FIG. 14 is an oblique view of a vehicle having a conventional window glass.

Referring more particularly to the drawings, FIG. 14 is a rough illustration of conventional window glass in which thermal defogging wires 12 and an FM antenna 14 have been both formed in the rear window glass 10 of a motor vehicle by a printed pattern method. The thermal defogging wires 12 are supplied with electrical current from the battery by a current supply wire 16. Furthermore, the signals received by the antenna 14 are transmitted to the FM radio (not shown) by a transmission cable 18.

Figure 15:
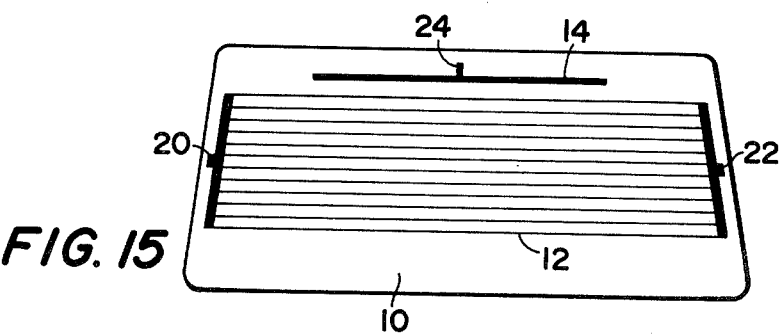
FIG. 15 is a front view of the window glass of FIG. 14.

FIG. 15 is a magnification of the window glass shown in FIG. 14. The thermal defogging wires 12 are equipped with a current supply terminal 20 in the power source side and with another current supply terminal 22 on the ground side. Furthermore, a feeder terminal 24 which is coupled to the transmission cable 18 is installed at approximately the center of the antenna 14. Each of the terminals 20, 22 and 24 is conductively connected to a corresponding terminal on the vehicle body side when the window glass 10 is inserted into the window frame on the body of the vehicle.

In the rear window glass such as shown in FIG. 15, the antenna 14 is installed adjacent to the thermal defogging wires 12 at a position only a few centimeters away. Generally speaking, high frequency noise currents that have built up and have been propagated in the current supply wire 16 will flow into the thermal defogging wires 12. It is therefore understandable that a large amount of noise will enter the antenna 14 installed adjacent to the thermal defogging wires 12 due to electrostatic, electromagnetic and radiation coupling. The large amount of noise current which enters the antenna 14 causes a noticeable drop in the signal to noise ratio of the signals received.

The thermal defogging wire equipped window glass in this invention may be employed either in windshields or rear windows of vehicles. Furthermore, this invention may be applied either to window glass equipped with a built-in antenna or to window glass without an antenna which is only equipped with thermal defogging wires. However, the following embodiments describe thermal defogging wire equipped rear window glass which includes an antenna.

Figure 1:
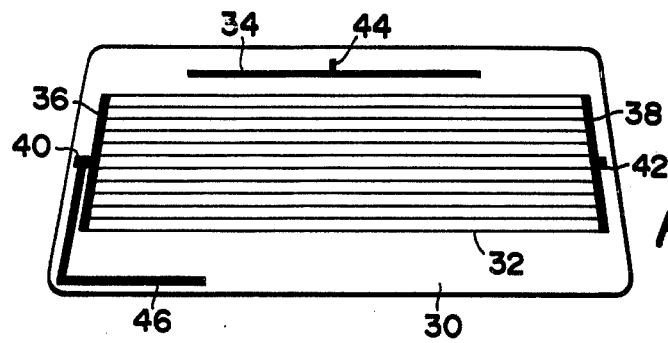
FIG. 1 is a front view of a window glass equipped with a pattern of thermal defogging wires according to the teachings of the present invention.

Referring to FIG. 1, shown therein is a first embodiment of an automobile window glass in accordance with the teachings of the present invention. In FIG. 1, thermal defogging wires 32 which are made up of multiple conductive wires arranged at equal intervals on the surface of the window glass and an FM antenna 34 which is placed above the thermal defogging wires are both installed in the rear window glass 30. The thermal defogging wires 32 are constructed in such a fashion that the individual conductive wires are connected together at both ends by conductive wires 36 and 38. The power source current supply terminal 40 and the ground side current supply terminal 42, which both project towards the outside of the window glass, are respectively connected at the approximate centers of the connecting wires 36 and 38. A feeder terminal 44 projects upward from where it is installed in the approximate center of the FM antenna 34. The FM antenna should ideally form a dipole antenna which extends in both directions from the feeder point ¼ of the wave length of the signals received.

The unique feature of the first embodiment is that a low impedance branch line 46 is connected to the current supply terminal 40. This branch line 46 is formed by a conductive wire whose other end is open. Its length is established as $\lambda$ divided by 4, where $\lambda$ represents the wave length of the center frequency of the FM band. Generally speaking, the length of the branch line 46 would be ideally established at any arbitrarily selected length among the following: $\lambda$ divided by 4 plus $\lambda$ divided by 2 times $n$ where $n$ equals 0, 1, 2, . . . . By establishing the length of the branch line 46 in this manner, any high frequency noise currents in the frequency range in which the wire propagation wave length of the noise current equals $\lambda$ is suppressed. High frequency noise currents flow from the current supply terminal to the battery and from the ground side supply terminal into the defogging wires 32. Due to the impedance mismatch at both terminals 40 and 42 of the thermal defogging wires 32, a distribution of standing waves of the high frequency noise currents is formed on the thermal defogging wires 32. This high frequency noise current enters the FM antenna 34 and exerts various detrimental influences which cause severe deterioration in the reception characteristics of the FM radio. However, in this invention, since the greater part of the high frequency noise current is removed by the low impedance branch line 46, the high frequency noise current flowing through the thermal defogging wires 32 is suppressed.

Looking at the low impedance branch 46 from its connection point 40, the input impedance has a very low value of just a few ohms. On the other hand, looking at the thermal defogging wires 32 (which are the load) from the same connection point 40, the input impedance of the thermal defogging wires 32 is determined by their characteristic impedance and is a high value ranging from several tens to several hundreds of ohms. Accordingly, the greater part of the high frequency noise current propagated in the defogger current supply wire 16 flows into the low impedance branch line 46 and high frequency noise currents almost cease to flow in the thermal defogging wires 32. This phenomenon is not limited by the frequency of the noise currents. It makes noise suppression possible as a frequency band phenomenon occurring throughout the frequency range which includes the frequency of the noise current. The high frequency noise current which has flowed into the branch line 46 flows into a return circuit formed by the window frame and/or by the body of the vehicle. The propagation of the noise current in the thermal defogging wires 32 is thus suppressed and the entrance of noise into the antenna is prevented.

In the first embodiment of FIG. 1, the branch line 46 is connected to the current supply terminal 40 on the power source side, but connection of the branch line 46 to the ground side supply terminal 46 or to both terminals would also be suitable. Furthermore, in the first embodiment the length of the branch line is established as $\lambda$ divided by 4 wave-lengths or 70 centimeters in the case of an FM radio frequency of 85 megahertz. Furthermore, it is within the scope of the invention that a branch line with a short circuited end could also be used as the low impedance branch line for suppression of the noise current. In this case, the length of the branch line 46 is established as follows: $\lambda$ divided by 2 times $n$ plus 1.

Figure 2:
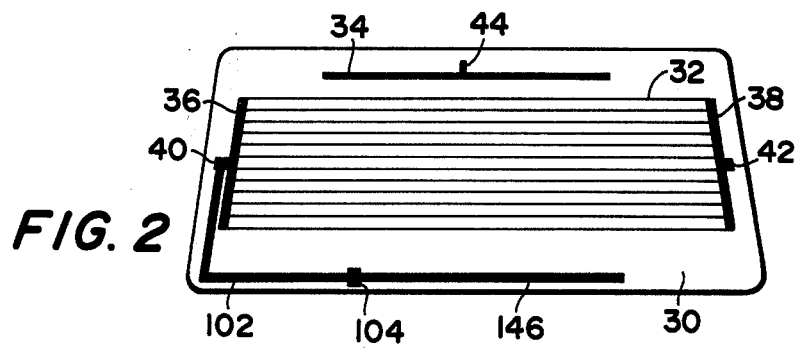
FIG. 2 is a front view showing the connection of a branch line in the area of a standing wave null which illustrates a second embodiment of the present invention.

Referring now to FIG. 2, shown therein as a second embodiment of the present invention. The one unqiue feature shown here is the connection of one end of the low impedance branch line 146 near a null position of the standing wave of the noise current. In order to obtain this construction, the current supply wire 102, which is extended on the window glass 30 from the terminal 40 of the thermal defogging wires 32, is formed by simultaneous printing. Furthermore, the defogger's current supply terminal 104 is installed in a position corresponding to a null in the standing wave pattern of the noise current and the branch line 146 is connected to the null point 104.

In the second embodiment, since the connection point of the branch line 146 is deliberately placed at a null point of standing wage, the impedance seen when looking at the thermal defogging wires 32 from this connection point has a very high value of several hundred ohms. Accordingly, since the difference in impedance between this and the branch line 146 is higher than the embodiment in FIG. 1, the high frequency noise currents can be drawn even more surely into the branch line 146. In most cases it is common for the null for the standing wave pattern to be rather close to the terminal 40. Therefore, in the second embodiment the connection point 104 has been established at a position λ divided by 4 wave-lengths or approximately 70 centimeters from the terminal 40.

Figure 3:
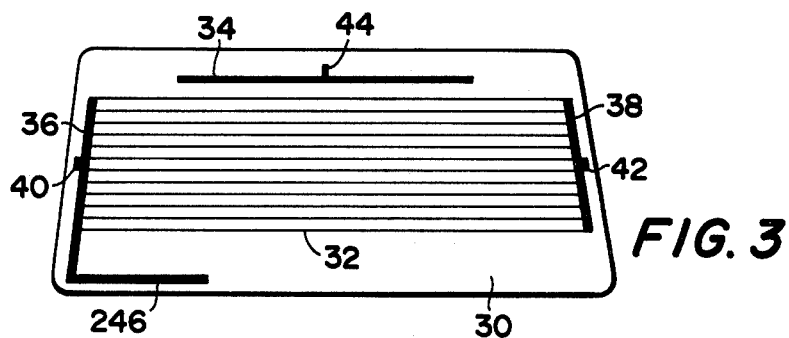
FIG. 3 is a front view of a third embodiment of the present invention.

Referring to FIG. 3, shown therein is a third embodiment of the present invention. One of the unique features in the third embodiment is that the low impedance branch line and the lead wire to the thermal defogging wires 32 form a common pattern. The low impedance branch line 246 is formed as an extension of the connecting wire 36. The length of this line is established so as to be approximately λ divided by 4 as measured from the terminal 40. As a result, this arrangement has the advantage of saving space and simplifying the construction of branch line 246.

Figure 4:
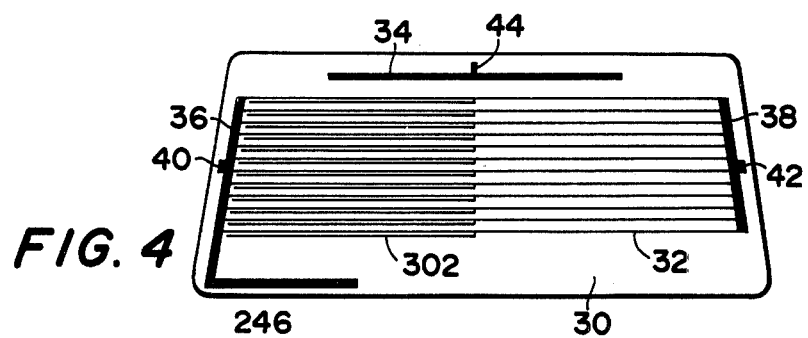
FIG. 4 is a front view of a fourth embodiment of the present invention.

Referring to FIG. 4, shown therein is a fourth embodiment of the present invention. In the fourth embodiment, secondary branch lines are provided in order to increase the effectiveness of the noise current suppression. Almost all of the noise currents propagated by the current supply wire is suppressed by the installation of a primary low impedance branch line 246. However, some noise current still flows into the thermal defogging wires, particularly in cases where the primary branch line 246 is connected in the vicinity of a standing wave node. This inflowing noise current still has a detrimental effect upon the antenna 34. Since the inflowing noise current forms a standing wave pattern distribution on the thermal defogging wires 32, it is also possible to suppress this inflowing noise by installing secondary branch lines at or near the vicinity of the standing wave nulls in the thermal defogging wires 32 as shown in FIG. 4. In the fourth embodiment, one secondary branch line 302 is installed for each thermal defogging wire at a null of the standing wave pattern, thereby suppressing the noise current level.

Figure 5:
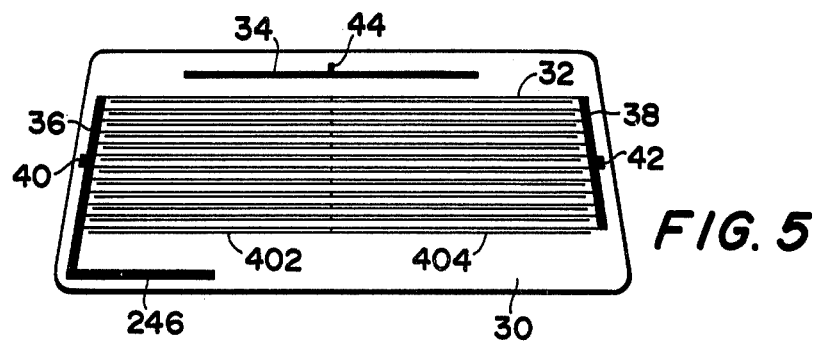
FIG. 5 is a front view of a fifth embodiment of the present invention.

Referring to FIG. 5, shown therein is a fifth embodiment of the present invention. In the fifth embodiment the secondary branch lines 402 extend in a direction towards terminal 40 and the secondary branch lines 404 extend in a direction towards the other terminal 42. In this embodiment, noise current will be effectively suppressed by the secondary branch lines 402 and 404 whether it enters the thermal defogging wires 32 from terminal 40 on the power side or from terminal 42 on the ground side.

Figure 6:
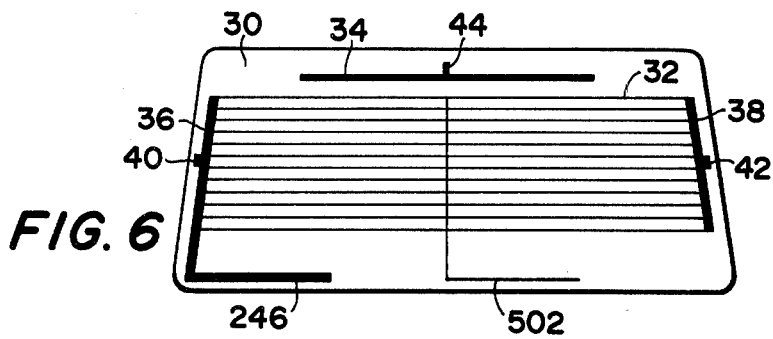
FIG. 6 is a front view of a sixth embodiment of the present invention.

Referring to FIG. 6, shown therein is a sixth embodiment of the present invention. One of the unique features here is that the secondary branch line 502 is provided such that it is connected to each of the thermal defogging wires 32. In this embodiment the secondary branch line 502 is simple in form and since the length of the secondary branch line 502 varies relative to each of the defogging wires 32, the noise suppression is extended over a broad frequency range.

Figure 7:
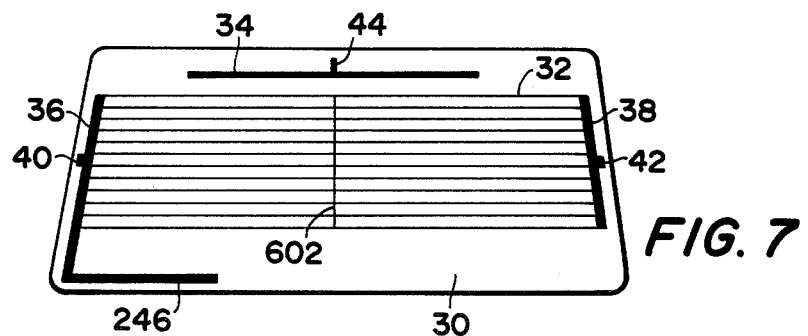
FIG. 7 is a front view of a seventh embodiment of the present invention.

Referring to FIG. 7, shown therein is a seventh embodiment of the present invention. In the seventh embodiment, the secondary low impedance branch line 502 previously described in the sixth embodiment is simplified even further. This embodiment has the added advantage of simplifying the printed pattern on the automobile window glass 30 and thus reducing the cost of manufacture. The secondary branch line 602 simply connects all of the thermal defogging wires 32 together. Clearly, this is a vastly simplified configuration which effectively suppresses the generation of noise current in the defogging wires 32.

Figure 8:
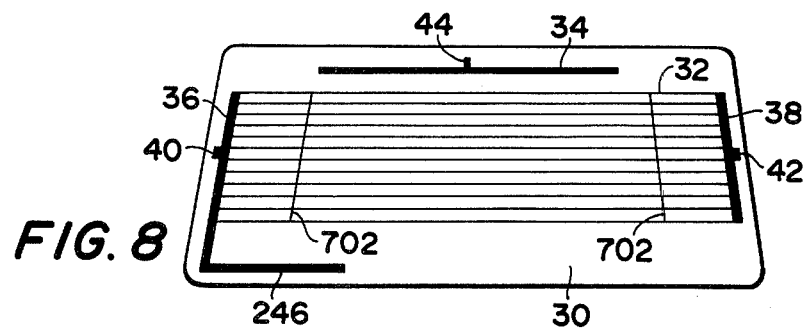
FIG. 8 is a front view of an alternate form of the embodiment of FIG. 7.
Figure 9:
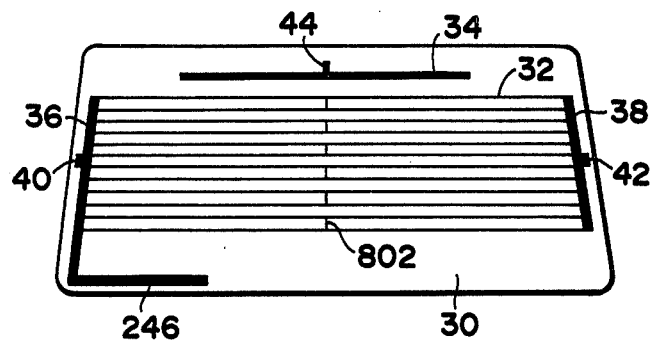
FIG. 9 is a second alternate form of the embodiment of FIG. 7.
Figure 10:
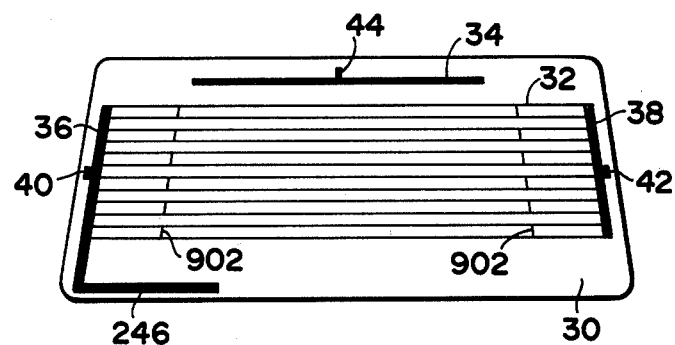
FIG. 10 is a frontal view of a third alternate form of the embodiment of FIG. 7.

The eighth, ninth and tenth embodiments of the present invention, as illustrated in FIGS. 8, 9 and 10 respectively, are more or less similar to the seventh embodiment and are simply alterations in the form of the secondary low impedance branch lines. In particular, in FIG. 8 there are provided two low impedance branch lines 702, one near terminal 40 and one near terminal 42. In FIG. 9, the secondary branch line 802 comprises a plurality of short conductive segments which connect together pairs of defogging wires 32. In FIG. 10, the low impedance secondary branch lines 902 comprise two sets of conductive segments which couple together pairs of thermal defogging wires 32.

Furthermore, the form and number of low impedance branch lines in this invention are optimally chosen in accordance with the noise frequency band and the size of the vehicle involved. For example, the installation of multiple primary branch lines at multiple positions of standing wave nulls would be appropriate. Furthermore, it would be possible to design the branch lines in a horizontal, oblique, or arc pattern.

Figure 11:
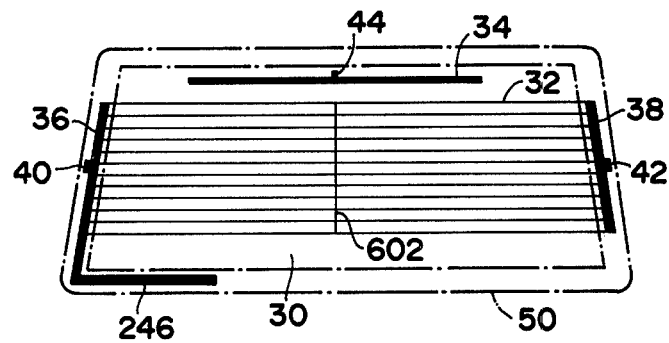
FIG. 11 is a front view illustrating the relationship between the window glass and the glass frame in the embodiment of FIG. 7.

Referring to FIG. 11, shown therein is the window glass 30 in accordance with the embodiment of FIG. 7 attached to a glass frame 50. The broken line indicates the glass frame 50. It can be seen from FIG. 11 that the branch line 46 is completely hidden inside the glass frame 50. Accordingly, as seen from the outside, there is almost no difference between the conventional auto window glass and the window glass involved in this invention, and the driver is provided with a good field of vision. Furthermore, since the secondary branch line 602 is formed with a very fine wire, there is no obstruction of rear vision. The use of transparent materials for these branch lines would also be appropriate and is within the scope of the present invention.

Figure 12:
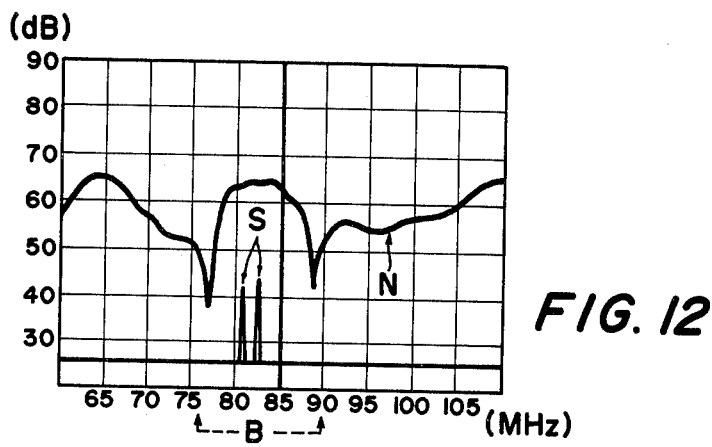
FIG. 12 is a graph of the noise characteristics of a prior art window glass.
Figure 13:
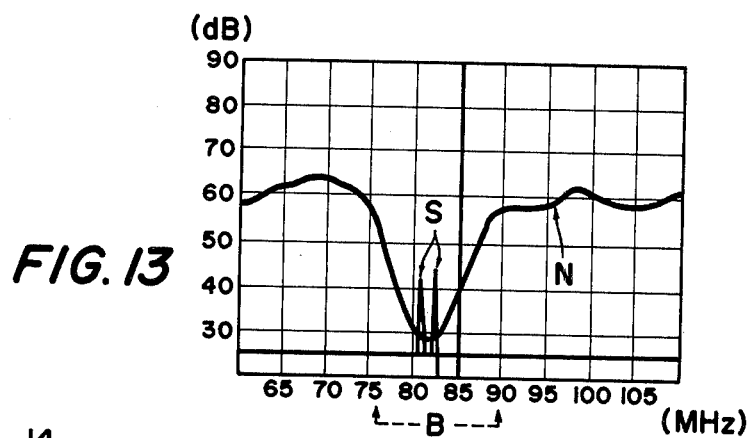
FIG. 13 is a graph of the noise characteristics of a window glass in accordance with the teachings of the present invention.

Referring to FIGS. 12 and 13, shown therein are experimental results achieved with a conventional window glass and with megahertz, window glass in accordance with the seventh embodiment of this invention. In the experiments, the thermal defogging wires are supplied with noise currents of a frequency ranging from several tens to several hundreds of megaherta, with a more or less uniform spectrum by means of a pulse oscillator. The noise level appearing at the antenna terminals was measured with a spectrum analyzer. In each figure, the horizontal axis represents the frequency, and the vertical axis represents voltage strength. In FIGS. 12 and 13, N equals the noise component, S equals the FM signal and band B is the FM broadcast frequency band.

FIG. 12 is an example of the noise currents in a conventional window glass. In a conventional window glass as shown in FIG. 12, the component N exceeds the FM wave signal S, thereby making clear reception almost impossible. In contrast to this, it can be seen from FIG. 13 that the noise current in the window glass in accordance with the teachings of the present invention is suppressed in the FM broadcast band, this causing an improvement in the signal to noise ratio.

As described above, the following various advantages may be obtained with the present invention;

1. Effective noise suppression may be achieved merely by connecting a simple branch line to the thermal defogging wires 32 without affecting the operation of the thermal defogging wires 32.

2. All components of the thermal defogging wires and branch lines can be formed simultaneously by printing them on the window glass. This allows for uniform quality to be obtained. Furthermore, besides being less expensive, this invention provides a thermal defogging wire and noise suppression means which has superior vibration proof and shock proof characteristics.

3. Since the glass is securely attached to the glass frame or to the body of the vehicle, its characteristics are stabilized at the condition that they were in when the glass is inserted into the motor vehicle.

In all cases it is understood that the above described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

We claim:

1. A defogging window glass for use in motor vehicles comprising:

thermal defogging wires contiguous with said window glass empowered by a source of electrical power, said terminal defogging wires being formed as a conductive pattern within said window glass;

an antenna provided in said window glass, said antenna being formed as a conductive pattern within said window glass;

a primary low impedance branch line coupled directly to said thermal defogging wires at a terminal of said thermal defogging wires to which electrical power is applied, said primary low impedance branch line comprising a conductive pattern formed within said window glass and having an open end and a length substantially equal to $\lambda$ divided by $4+\lambda$ divided by $2 \times n$ where $n$ equals 0, 1, 2... and $\lambda$ equals the propagation wave length of the noise current desired to be suppressed; and a secondary low impedance branch line contiguous with said window glass and directly coupled at one end to said thermal defogging wires to thereby greatly suppress noise currents in said thermal defogging wires, said secondary low impedance branch line comprising a conductive pattern formed within said window glass and having an open end and a length substantially equal $\lambda$ divided by $4+\lambda$ divided by $2 \times n$ where $n$ equals 0, 1, 2... and $\lambda$ equals the propagation wave length of the noise current desired to be suppressed.

2. A defogging window glass for use in motor vehicles according to claim 1 wherein said primary low impedance branch line is formed adjacent an edge of said window glass such that said primary low impedance branch line would be hidden inside a glass frame when said window glass is installed within said glass frame and said secondary branch line comprises a very fine conductive line extending substantially down the center of and transverse to said defogging wires.

3. A defogging window glass for use in motor vehicles according to claim 1 wherein said secondary low impedance branch lines comprise a plurality of short conductive pattern segments which connect together pairs of said terminal defogging wires.

* * * * *